United States Patent
Liao et al.

(10) Patent No.: US 7,136,078 B2
(45) Date of Patent: Nov. 14, 2006

(54) CONNECTION DEVICE CAPABLE OF MIXING AN RGB GRAPHICS SIGNAL AND A YUV VIDEO SIGNAL AND RELATED METHOD

(75) Inventors: Ira Liao, Taipei Hsien (TW); Lizst Hsu, Taipei Hsien (TW); Stam Chuang, Taipei Hsien (TW)

(73) Assignee: VIA Technologies Inc., Hsin-Tien (TW)

( * ) Notice: Subject to any disclaimer, the term of this patent is extended or adjusted under 35 U.S.C. 154(b) by 185 days.

(21) Appl. No.: 10/711,192

(22) Filed: Aug. 31, 2004

(65) Prior Publication Data

US 2005/0128216 A1 Jun. 16, 2005

Related U.S. Application Data

(60) Provisional application No. 60/481,801, filed on Dec. 16, 2003.

(51) Int. Cl.
*G09G 5/02* (2006.01)

(52) U.S. Cl. .............. 345/604; 345/629; 345/603; 348/598; 348/599; 348/600; 348/589

(58) Field of Classification Search ............ None
See application file for complete search history.

(56) References Cited

U.S. PATENT DOCUMENTS

| | | | |
|---|---|---|---|
| 4,737,772 A | 4/1988 | Nishi et al. | |
| 5,544,202 A | 8/1996 | Jackson et al. | |
| 5,671,069 A | 9/1997 | Kodama | |
| 6,535,217 B1 | 3/2003 | Chih et al. | |
| 6,573,905 B1 * | 6/2003 | MacInnis et al. | 345/629 |
| 6,738,417 B1 | 5/2004 | Kim et al. | |
| 6,867,781 B1 | 3/2005 | Van Hook et al. | |
| 6,900,845 B1 | 5/2005 | Christopher et a | |
| 2003/0206180 A1 * | 11/2003 | Ehlers et al. | 345/604 |

* cited by examiner

*Primary Examiner*—Mark Zimmerman
*Assistant Examiner*—Jwalant Amin
(74) *Attorney, Agent, or Firm*—Winston Hsu

(57) ABSTRACT

A connection device capable of mixing an RGB graphics signal and a YUV video signal. The connection device includes a graphics conversion module for transforming an RGB graphics signal into a YUV graphics signal, and a mixing module connected to the graphics conversion module for receiving a YUV video signal and the YUV graphics signal from the graphics conversion module. The mixing module outputs a YUV signal after mixing the YUV video signal and the YUV graphics signal.

6 Claims, 1 Drawing Sheet

CONNECTION DEVICE CAPABLE OF MIXING AN RGB GRAPHICS SIGNAL AND A YUV VIDEO SIGNAL AND RELATED METHOD

BACKGROUND OF INVENTION

1. Field of the Invention

The present invention relates to a connection device and related method, and more particularly, to a connection device capable of mixing an RGB graphics signal and a YUV video signal and related method.

2. Description of the Prior Art

In computer systems, input formats of video signals and graphics signals are typically different. The input format of video signals is luminance-bandwidth-chrominance (YUV or YCbCr) or red-green-blue (RGB). However, the input format of graphics signals is RGB. If a display device, such as a liquid crystal display (LCD), cathode ray tube (CRT) or plasma display panel (PDP) display, is compatible with a computer the output format of the video signal and the graphics signal are both RGB. If the display is a TV, the output format of the video signal and the graphics signal must be YUV (or YCbCr) to comply with the format of TV signals. Therefore, in the prior art, if the input format of the video signal is YUV (or YCbCr) and the display is a TV, the YUV video signal must be first transformed into an RGB video signal, mixed with an RGB graphics signal, transformed into a YUV signal, and then output to the TV. During the process of transformation, distortion (such as color distortion) of the video signal can occur.

Please refer to FIG. 1. FIG. 1 is a diagram of a connection device 100 according to the prior art. The connection device 100 comprises a first video transforming module 120, a second video transforming module 140, a mixing module 130, a TV output interface 110, an LCD output interface 112, a CRT output interface 114, and a PDP output interface 116. The first video transforming module 120 is utilized for transforming a YUV video signal into an RGB video signal. The mixing module 130 is utilized for mixing an RGB graphics signal and the RGB video signal generated by the first video transforming module 120. The second video transforming module 140 is utilized for transforming an RGB signal generated by the mixing module 130 into a YUV signal.

When receiving a YUV video signal, the first video transforming module 120 transforms the YUV video signal into an RGB video signal and outputs the RGB video signal to the mixing module 130. The mixing module 130 is utilized for receiving the RGB video signal and the RGB graphics signal, mixing the two signals and then outputting the mixed signals to an output interface to simultaneously represent the video and graphics signals on a display. If the display, such as an LCD, CRT or PDP display, is compatible with a computer the mixing module 130 directly outputs the mixed RGB signals to the LCD output interface 112, CRT output interface 114 or PDP output interface 116. If the display is a TV, the mixing module 130 outputs the mixed RGB signals to the second video transforming module 140. The second video transforming module 140 transforms the mixed RGB signals into YUV signals and then the YUV signals are output to the TV output interface 110.

As mentioned above, in the prior art connection device 100, the YUV video signal must be transformed into an RGB video signal by the first video transforming module 120. If the display is a TV, the RGB video signal will be transformed back into the YUV video signal by the second video transforming module 140. Then the YUV video signal is output to the TV. Due to the two transformations of the original video signal, distortion (such as color distortion) of the original video signal output to the TV can occur.

SUMMARY OF INVENTION

It is therefore a primary objective of the claimed invention to provide a connection device capable of mixing an RGB graphics signal and a YUV video signal and related method to solve the above-mentioned problems.

The claimed invention discloses a connection device capable of mixing an RGB graphics signal and a YUV video signal. The connection device includes a graphics conversion module for transforming an RGB graphics signal into a YUV graphics signal, and a mixing module connected to the graphics conversion module for receiving a YUV video signal and the YUV graphics signal from the graphics conversion module. The mixing module outputs a YUV signal after mixing the YUV video and graphics signals.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
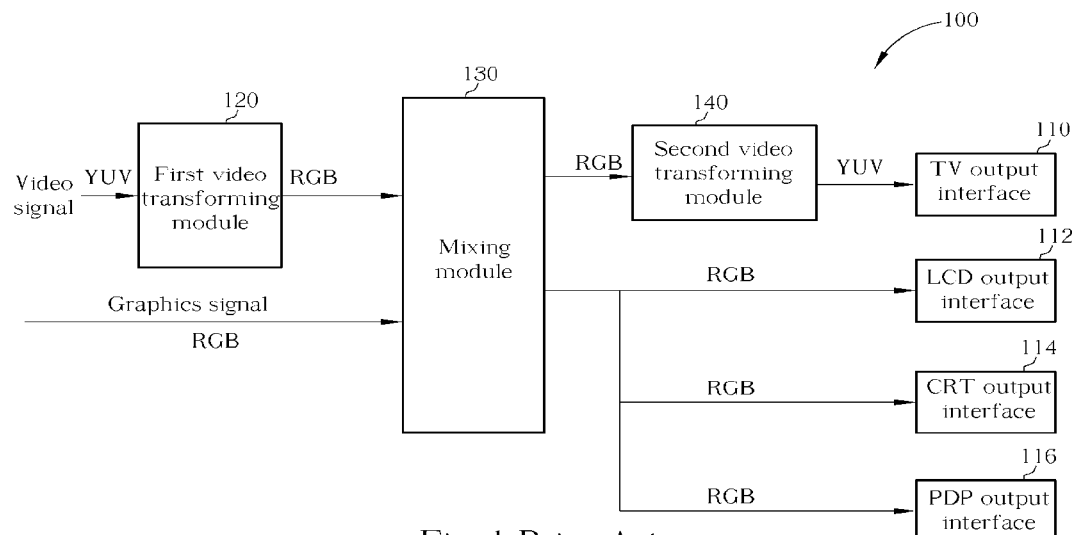
FIG. 1 is a diagram of a connection device according to the prior art.
Figure 2:
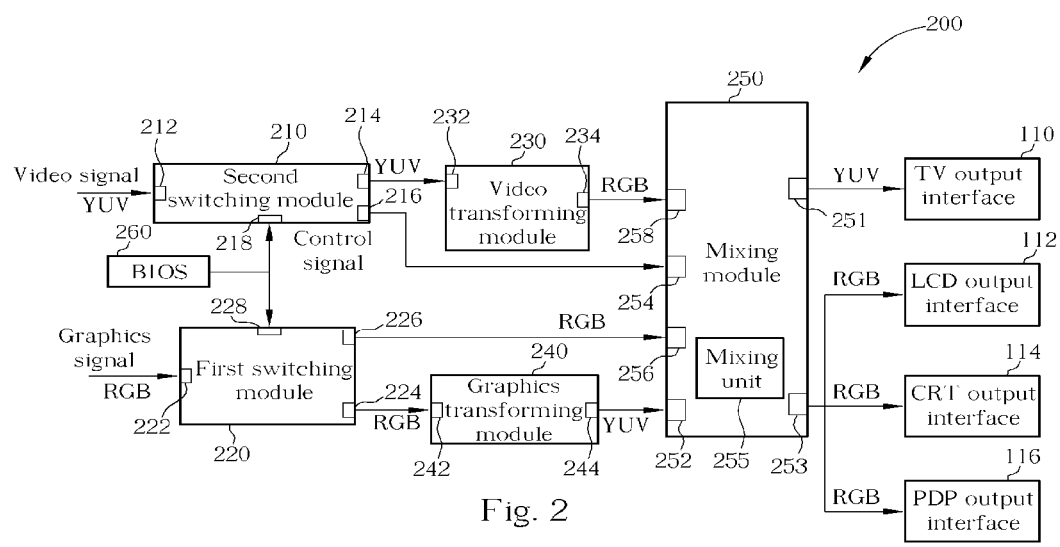
FIG. 2 is a diagram of a connection device according to the present invention.

Please refer to FIG. 2. FIG. 2 is a diagram of a connection device 200 according to the present invention. The connection device 200 comprises a video transforming module 230, a graphics transforming module 240, a mixing module 250, a TV output interface 110, an LCD output interface 112, a CRT output interface 114, a PDP output interface 116, a first switching module 220, a second switching module 210, and a basic input-output system (BIOS) 260. The BIOS 260 is connected to a control node 228 of the first switching module 220 for selecting one of the two outputs 224 and 226 of the first switching module 220 to output the RGB graphics signal received from the input 222 of the first switching module 220, and to a control node 218 of the second switching module 210 for selecting one of the two outputs 214 and 216 of the second switching module 210 to output the YUV video signal received from the input 212 of the second switching module 210.

For instance, if the BIOS 260 detects that the display is a TV, the BIOS 260 outputs a control signal to the control node 228 of the first switching module 220 and to the control node 218 of the second switching module 21. Therefore, the RGB graphics signal received by the first switching module 220 is transmitted to the input 242 of the graphics transforming module 240 through the first output 224 of the first switching module 220. The second switching module 210 outputs the YUV video signal to the second input 254 of the mixing module 250 through the second output 216 of the second switching module 210. The graphics transforming module 240 transforms the RGB graphics signal into a YUV graphics signal and outputs the YUV graphics signal from an output 244 of the graphics transforming module 240 to the first input 252 of the mixing module 250. The mixing unit 255 of the mixing module 250 mixes the YUV graphics signal received by the first input 252 and the YUV video signal received by the second input 254. Finally, the first output 251 of the mixing module 250 outputs a YUV signal generated by the mixing unit 255 to the TV output interface 110. If the BIOS 260 detects that the display is compatible with a computer, i.e. that the display is an LCD, CRT or PDP, the BIOS 260 outputs a control signal to the control node 228 of the first switching module 220 and the control node 218 of the second switching module 210. The YUV video signal received by the second switching module 210 is transmitted to the input 232 of the video transforming module 230 through the first output 214 of the second switching module 210, while the RGB graphics signal received by the first switching module 220 is transmitted to the third input 256 of the mixing module 250 through the second output 226 of the first switching module 220. The video transforming module 230 transforms the YUV video signal into an RGB video signal and outputs the RGB video signal from an output 234 of the transforming module 230 to the fourth input 258 of the mixing module 250. The mixing unit 255 of the mixing module 250 mixes the RGB graphics signal received by the third input 256 and the RGB video signal received by the fourth input 258. Finally, the second output 253 of the mixing module 250 outputs an RGB signal generated produced by the mixing unit 255 to the LCD output interface 112, CRT output interface 114, or PDP output interface 116.

In the present invention, if the display is a TV, the YUV video signal does not need to be first transformed into an RGB video signal and then transformed back into a YUV video signal. That is, the YUV video signal is not transformed twice. Instead, the YUV video signal is directly input into the mixing unit 255 of the mixing module 250 and mixed with the YUV graphic signal for generating a YUV signal output to the TV. Therefore, the present invention can reduce the distortion when video signals are output to a TV. In addition, the BIOS 260 outputs a control signal to switch the outputs of the first and second switching modules 220 and 210 based on the type of the display. Thus, the present invention is capable of mixing video signals and graphics signals under the lowest distortion condition, and then outputting these signals to a display.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A connection device capable of mixing a red-green-blue (RGB) graphics signal and a luminance-bandwidth-chrominance (YUV) video signal comprising:
 a graphics transforming module for transforming the RGB graphics signal into a YUV graphics signal;
 a mixing module connected to the graphics transforming module for receiving the YUV video signal and the YUV graphics signal from the graphics transforming module, the mixing module outputting a YUV signal after mixing the YUV video signal and the YUV graphics signal;
 a first switching module for receiving the RGB graphics signal, the first switching module including:
  a first output for outputting the RGB graphics signal to the graphics transforming module; and
  a second output for outputting the RGB graphics signal to the mixing module;
 a video transforming module connected to the mixing module for transforming the YUV video signal into an RGB video signal;
 a second switching module for receiving the YUV video signal, the second switching module including:
  a first output for outputting the YUV video signal to the video transforming module; and
  a second output for outputting the YUV video signal to the mixing module;
 an output interface directly connected to the mixing module for receiving the output of the mixing module; and
 a basic input-output system (BIOS) for selecting one of the two outputs of the first switching module to output the RGB graphics signal and for selecting one of the two outputs of the second switching module to output the YUV video signal according to the output interface connected to the mixing module;
 wherein the mixing module is capable of receiving the RGB graphics signal and the RGB video signal, and outputting an RGB signal after mixing the RGB graphics signal and the RGB video signal.

2. The connection device of claim 1 wherein the output interface is a TV output interface.

3. The connection device of claim 1 wherein the output interface is a liquid crystal display (LCD) output interface.

4. The connection device of claim 1 wherein the output interface is a cathode ray tube (CRT) output interface.

5. The connection device of claim 1 wherein the output interface is a plasma display panel (PDP) output interface.

6. A method For mixing an RGB graphics signal and a YUV video signal comprising:
 inputting an RGB graphics signal into a first switching module;
 inputting a YUV video signal into a second switching module;
 when detecting that an output interface is the output interface receiving a YUV signal, a control signal is utilized for controlling the first switching module to transform the RGB graphics signal into a YUV graphics signal, and mixing the YUV graphics signal and the YUV video signal of the second switching module for generating the YUV signal;
 when detecting that an output interface is the output interface receiving an RGB signal, the control signal is utilized for controlling the second switching module to transform the YUV video signal into an RGB video signal, and mixing the RGB video signal and the RGB graphics signal of the first switching module for generating the RGB signal; and
 outputting the mixed signal directly to the output interface.

* * * * *